United States Patent [19]
Green

[11] 3,813,490
[45] May 28, 1974

[54] COLOUR TELEVISION CAMERAS

[75] Inventor: Ian MacDonald Green, Buckie, Scotland

[73] Assignee: EMI Limited, Hayes, Middlesex, England

[22] Filed: Oct. 4, 1972

[21] Appl. No.: 294,806

[30] Foreign Application Priority Data
Oct. 8, 1971 Great Britain .................... 46846/71

[52] U.S. Cl. .................................... 178/5.4 ST
[51] Int. Cl. .................................... H04n 9/06
[58] Field of Search .................. 178/5.4 ST, 5.4 TC; 350/317

[56] References Cited
UNITED STATES PATENTS

| | | | |
|---|---|---|---|
| 3,688,020 | 8/1972 | Kubota | 178/5.4 ST |
| 3,688,023 | 8/1972 | Kurokawa | 178/5.4 ST |
| 3,702,725 | 11/1972 | Macovski | 350/317 |
| 3,710,013 | 1/1973 | Kubota | 178/5.4 ST |

*Primary Examiner*—Richard Murray
*Attorney, Agent, or Firm*—Fleit, Gipple & Jacobson

[57] ABSTRACT

A colour television camera is disclosed which includes a pickup tube and a filter arrangement, disposed in the path of incident light to the tube, for analysing a viewed scene into three primary colours. The filter arrangement is such that video signals are derived from the tube in the form of two carrier waves which are respectively amplitude modulated by signals indicative of the differences in intensity between light of different pairs of said primary colours. A circuit arrangement is provided for processing said video signals to provide signals similar to those which are derived from a standard three-tube camera.

11 Claims, 5 Drawing Figures

COLOUR TELEVISION CAMERAS

Figure 1:
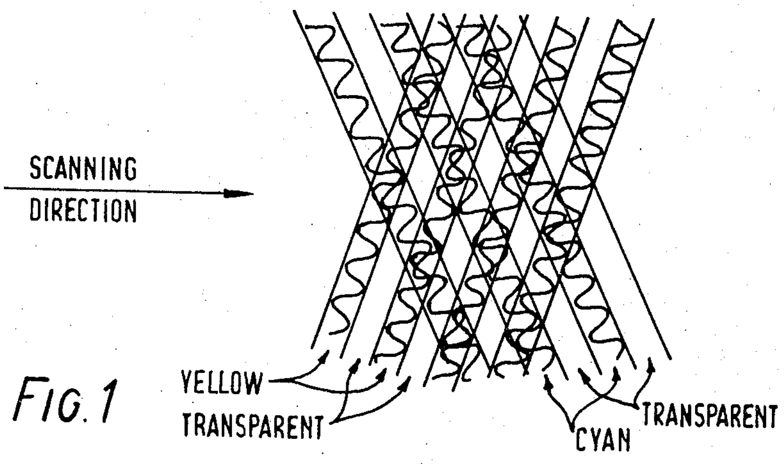

The present invention relates to colour television cameras of the kind in which signals relating to more than one colour component of a viewed scene are derived from one pickup tube.

According to the invention from one aspect there is provided a colour television camera which includes filter means for analysing a viewed scene with respect to three primary colours, a pickup tube including a target for receiving the analysed image of the scene, or an intensified version thereof, the filter means being such as to cause video signals derived on scanning the target of the pickup tube with the electron beam thereof to include a first carrier wave of which the amplitude represents the difference in intensity between two of said primary colours and a second carrier wave of which the amplitude represents the difference in intensity between the third and one of said two primary colours, and a circuit arrangement for determining the amplitude and polarity of the modulation of said carrier waves.

According to the invention from another aspect there is provided a colour television camera including at least one pickup tube having a light sensitive target on which light from a viewed scene can be incident, filter means interposed between the scene and the target for permitting light of these different spectral compositions to fall on respective parts of the target, said parts comprising, for light of a first and a second of said spectral compositions, a respective series of spaced, substantially parallel stripes, the two series of stripes being inclined relative to one another and, for light of the third spectral composition, discrete regions including areas interposed between the two series of stripes, so that video signals derived on scanning said target with the electron beam of the tube include two carrier signals amplitude modulated by quantities indicative respectively of the differences between the intensities of light of said first and third spectral compositions and between the intensities of said second and third spectral compositions incident on said target, means being provided for determining the amplitude and polarity of said difference quantities.

It will be evident from the foregoing that the invention in its broadest aspect provides a new principle, that of utilising, in the path of light to a pickup tube included in a colour television camera, filter means which permits the generation of two carrier waves which have amplitudes which are respectively indicative of the difference in intensity between different pairs of the three primary colour components. Changes in phase of either of the carrier waves may be due to either a reversal in sign of the respective intensity difference or to other causes such as imperfect scanning geometry of the pickup tube, so that it is necessary as will be made clear to determine the polarity of the respective intensity difference signals. By virtue of this new principle, the colour information relating to all three primary colours is treated in similar fashion so that colour shading effects tend to be reduced.

It is to be appreciated that, although in the following description of specific embodiments of the invention light from the viewed scene, after analysis by the filter means, is considered as falling directly on the target of a pickup tube this need not be the case. For example an image intensifier may be interposed between the filter means and the target.

Figure 2:
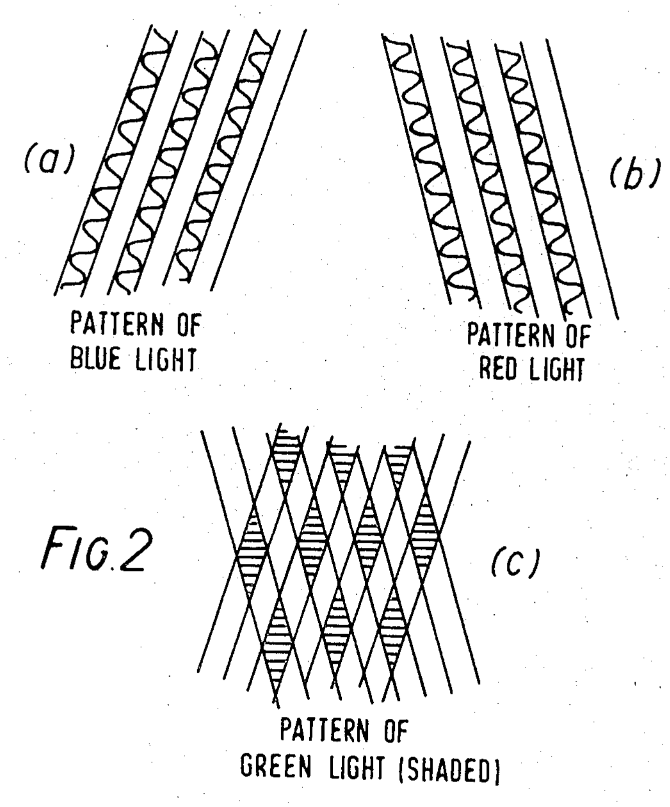
Figure 3:
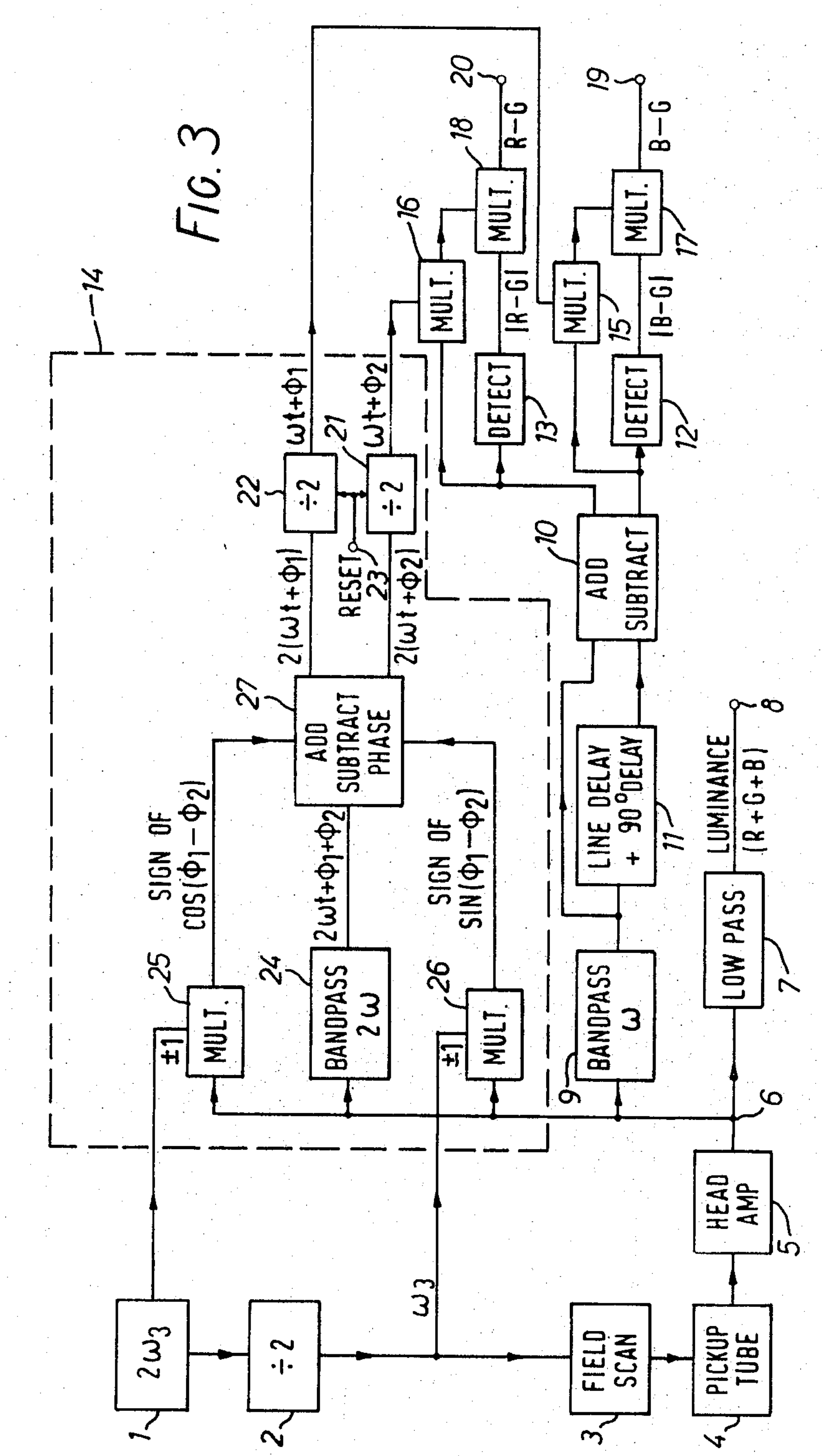
Figure 4:
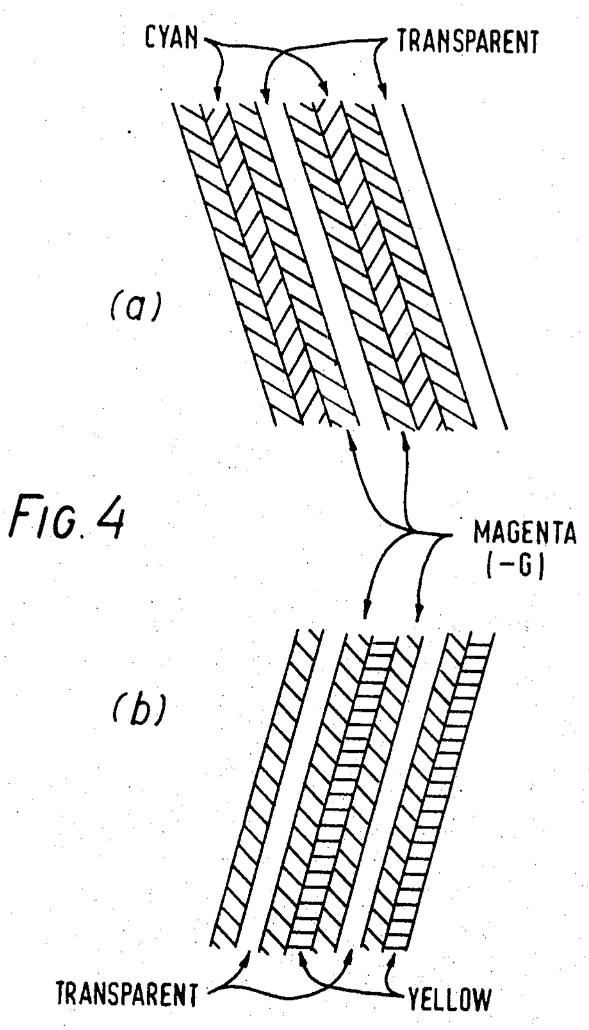
Figure 5:
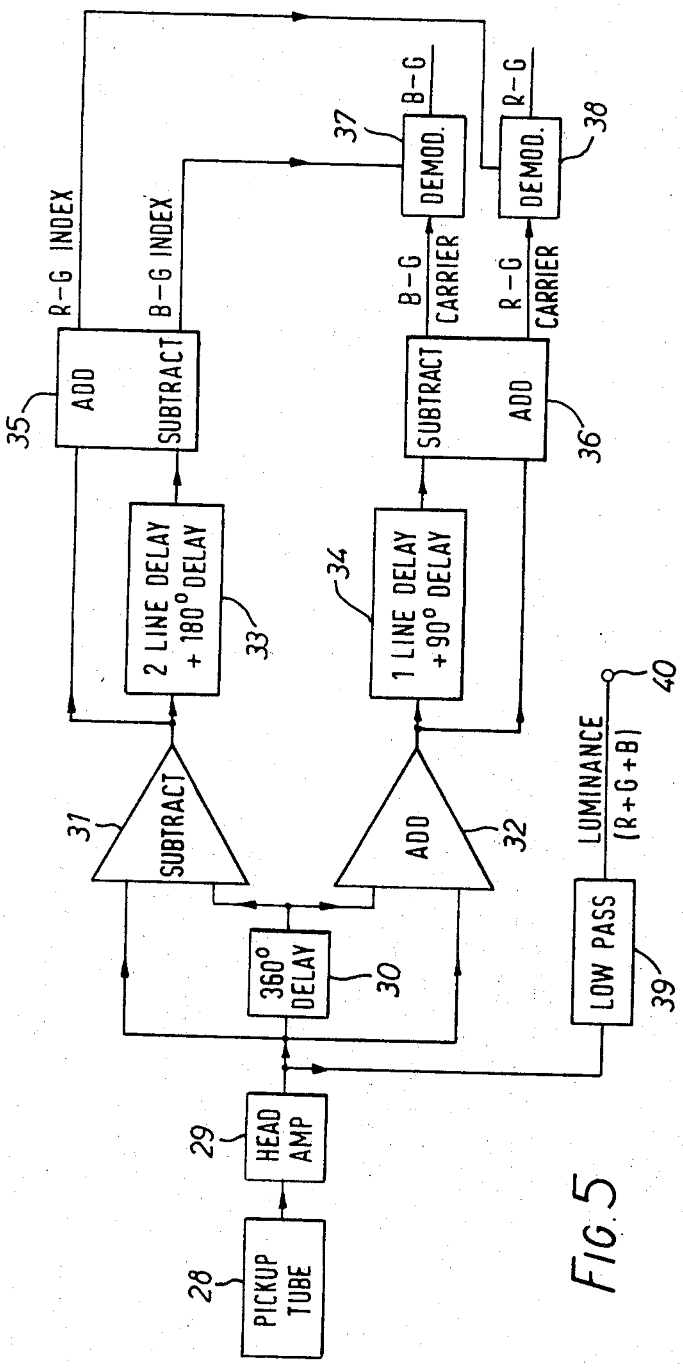

In order that the invention may be clearly understood and readily carried into effect, two embodiments thereof will now be described with reference to the accompanying drawings of which:

FIG. 1 shows part of a colour filter arrangement already proposed for a colour television camera, FIGS. 2*a*, 2*b* and 2*c* represent respectively patterns of light of each of three different spectral compositions which can be caused to fall on the target of a pickup tube included in a camera according to a first embodiment of the invention, FIG. 3 shows a circuit arrangement for a colour television camera according to said first embodiment of the invention, FIGS. 4a and 4b show part of optical filter means suitable for use in a colour television camera according to a second embodiment of the invention, and FIG. 5 shows a circuit arrangement for use in a colour television camera according to said second embodiment of the invention.

A proposed colour television camera includes, in the optical system, striped colour filters operating in focus on the target of a pickup tube in such a manner that two colours, for example, red and blue, are indicated by modulation of respective carrier signals in the output of the pickup tube while a third colour for example green, is indicated by a low frequency signal including a d.c. component. A filter corresponding to one such proposal is shown in part in FIG. 1. It provides for the two carrier signals to be at substantially the same frequency, but with respectively plus and minus 90° phase shift from line to line. This filter contains two sets of stripes, the stripes of each set being inclined at equal, but opposite angles to the forward line scanning direction of the pickup tube and the inclination of the stripes is arranged to provide the required phase shifts from line to line.

The stripes of one set are alternately yellow, i.e., blue absorbing and transparent, whereas the stripes of the other set are alternately cyan, i.e., red absorbing, and transparent.

A disadvantage of such systems is that, due to changes in focus over the scanned area, changes in the depth of modulation of the signal current from the pickup tube over the target area lead to corresponding variations in the amplitudes of the carrier signals. The green component, on the other hand, since it is not derived by such carrier methods, does not suffer from changes in the depth of modulation in this way. This differential performance leads to colour shading.

In a camera according to the invention, carrier signals having amplitudes proportional to a colour signal are replaced by carrier signals having amplitudes proportional to a colour difference signal as between colour primaries. This is achieved in a first embodiment by modification of the filter of FIG. 1, by replacing the transparent stripes thereof by magenta i.e., green absorbing, stripes. If a uniform series of intervening green absorbing stripes is symmetrically superimposed upon a uniform series of red absorbing stripes, then there will be produced a carrier signal modulated in amplitude by the difference between red and green intensities, R-G., namely by a colour difference signal between colour primaries.

Similarly, a second such combined set of stripes, alternately blue and green absorbing, can be arranged to produce a second carrier signal, this signal modulated in amplitude by the difference, B-G, between blue and green intensities. The second carrier signal thus produced can be separated from the first in the manner which will subsequently appear to give the respective amplitude modulations $|R-G|$ and $|B-G|$. In the circumstances that the widths of the stripes of the sets are all equal, changes in focus over the scanned area affect the values R, G and B equally and colour shading due to changes in focus can be substantially avoided.

If the colour difference quantities R—G and B—G are known in conjection say with a sum quantity R + G + B, or a linear magnitude in R, G and B, then the normal transmission quantities Y, R—Y and B—Y can be produced by matrixing, Y being the so-called luminance signal and R—Y and B—Y the so-called colour difference signals of the transmission. The colour difference quantities R—G and B—G may each assume positive and negative values and it is therefore necessary to determine both the amplitude and sign of the modulations of the carrier waves for the purposes of the matrixing.

The amplitudes of the carrier waves may be denoted respectively by the modulus quantities $|R-G|$ and $|B-G|$ as already indicated. To determine the appropriate signs for $|R-G|$ and $|B-G|$ additional information is required, and this reference or index information must be available at all times. As will be explained it requires to be related in frequency and phase to the carrier signals which are of course dependent on the incident colour, on the scanning rate and linearity, and on the pitch of the filter stripes. Accurate phase information is however not necessary in determining the sign; for example to determine the sign of the co-efficient $X$ in the expression $X\sin wt$, the maximum allowable phase error in the reference (index) signal of the same frequency is 90°. As will be described, the intermodulation of the overlapping green absorbing stripes can be arranged to yield the required information.

Thus assuming that the transparent stripes of FIG. 1 have been replaced by green absorbing stripes in the manner indicated, FIGS. 2*a*, 2*b* and 2*c* show parts of the pattern produced on the same region of the target of the camera pickup tube by light having red, green and blue components respectively. Let the green absorbing stripes of one set modulate such incident light to give a corresponding Fourier component signal of the form: $\frac{1}{2} + \frac{1}{2}\sin(\omega_1 t + \phi_1)$,
also let the green absorbing stripes of the other set similarly produce a corresponding Fourier component signal of the form: $\frac{1}{2} + \frac{1}{2}\sin(\omega_2 t + \phi_2)$,
where $\omega_1$ and $\omega_2$ are functions of scan position and in general different frequencies.

The superimposition of the stripes causes an electrical signal $S_G$ corresponding to a green illumination (which may be solely a bias lighting), to be produced according to the product of the above two forms. Thus multiplying out, the signal $$S_G = \frac{1}{4}A + \frac{1}{4}A\sin(\omega_1 t + \phi_1) + \frac{1}{4}A\sin(\omega_2 t + \phi_2) + \frac{1}{2}A\sin(\omega_1 t + \phi_1)\cdot\sin(\omega_2 t + \phi_2)$$

in which $A$ represents the intensity of the green illumination. The first of the four terms of the expression represents the so-called basband signal, and the second and third correspond to the carrier signals of the characteristic frequencies of the stripes. The fourth term is an intermodulation of the second and third, and the signal represented by this fourth term is used to give the required index information. In this respect the intermodulation term can be shown to consist of two components, respectively of the sum and the difference frequencies of the two basic carriers. Thus $$A\sin(\omega_1 t + \phi_1)\cdot\sin(\omega_2 t + \phi_2) = -\frac{1}{2}A\cos(\omega_1 t + \omega_2 t + \phi_1 + \phi_2) + \frac{1}{2}A\cos(\omega_1 t - \omega_2 t + \phi_1 - \phi_2).$$

If it is now assumed that $$\omega_1 = \omega_2 = \omega,$$

then the summation term $$-\frac{1}{2}A\cos(\omega_1 t + \omega_2 t + \phi_1 + \phi_2)$$

reduces to $$-\frac{1}{2}A\cos(2\omega t + \phi_1 + \phi_2)$$

and the difference term $$+\frac{1}{2}A\cos(\omega_1 t - \omega_2 t + \phi_1 - \phi_2)$$

reduces to $$+\frac{1}{2}A\cos(\phi_1 - \phi_2).$$

By reason of the inclination of the stripes of the two sets the phases $\phi_1$ and $\phi_2$ will change from line to line, but if the inclinations are equal and opposite then the sum of $\phi_1$ and $\phi_2$ will remain invariant. In these circumstances the signal components corresponding to the summation term can be detected using a narrow band filter passing at all times the frequency $2\omega$ taking into account its variation with scanning and such detection is a feature of the first embodiment of the invention. Second harmonic components of the colour difference carrier signals, which will exist to some extent in practice, occur at this same frequency, but they alternate in phase from line to line and so can be averaged out. If troublesome, they may be eliminated by line delay and addition methods.

The difference term is clearly a d.c. or baseband term along any one line, and the corresponding signal component for this reason is not easily detected. A vertical spot wobble method may however be employed. Let the spot wobble be of sufficient amplitude to change the phase difference $\phi_1 - \phi_2$ between $$\phi_1 - \phi_2 + \frac{1}{2}\pi$$

and $$\phi_1 - \phi_2 - \frac{1}{2}\pi$$

and assume that the wobble is purely sinusoidal and at a frequency $\omega_3$ which differs from $\omega$. Then the phase difference $$\phi_1 - \phi_2$$

becomes replaced by $$\phi_1 - \phi_2 + \frac{1}{2}\pi\sin\omega_3 t.$$

The difference term correspondingly becomes $$+\frac{1}{2}A\cos(\phi_1 - \phi_2 + \frac{1}{2}\pi\sin\omega_3 t) = \frac{1}{2}A\cos(\phi_1 - \phi_2)\cdot\cos(\frac{1}{2}\pi\sin\omega_3 t) - \frac{1}{2}A\sin(\phi_1 - \phi_2)\sin(\frac{1}{2}\pi\sin\omega_3 t)$$

The right hand side of this last equation may be approximated to $$+ \tfrac{1}{2}A \cos(\phi_1 - \phi_2) \cdot (1 + \cos 2\omega_3 t) - \tfrac{1}{2}A \sin(\phi_1 - \phi_2) \sin \omega_3 t.$$

By appropriate synchronous detection at the wobble frequency $\omega_3$, and at the second harmonic frequency $2\omega_3$, the coefficients $$- \tfrac{1}{2}A \sin(\phi_1 - \phi_2),$$

$$+ \tfrac{1}{2}A \cos(\phi_1 - \phi_2)$$

may be derived respectively, so enabling $\phi_1 - \phi_2$ to be uniquely determined.

By adding $\phi_1 - \phi_2$ to the sum signal phase $$2\omega t + \phi_1 + \phi_2,$$

this makes available a signal of phase $$2(\omega t + \phi_1),$$

while subtracting $\phi_1 - \phi_2$ from the same signal phase a signal of phase $$2(\omega t + \phi_2)$$

is separately made available.

In this way, according to the first embodiment of the invention to be described, two signals of phase $2(\omega t + \phi_1)$ and $2(\omega t + \phi_2)$ respectively are set up.

As previously mentioned it is in principle only necessary to know the reference phase to within 90°. Since A is greater than zero, knowledge of the signs of both the terms A cos $(\phi_1 - \phi_2)$ and A sin $(\phi_1 - \phi_2)$ is sufficient to determine $\phi_1 - \phi_2$ to within 45°.

This is followed out in the following table:

| | | A cos $(\phi_1-\phi_2)$ | |
|---|---|---|---|
| | | <0 | >0 |
| A sin $(\phi_1-\phi_2)$ | <0 | 225° | 315° |
| | >0 | 135° | 45° |

and in relation to this table, writing $x$ for $\phi_1 - \phi_2$ for simplicity, it is known that sin $x$ assumes positive values when $x$ lies between 0° and 90° and between 90° and 180° and negative values when $x$ lies between 180° and 270° and between 270° and 360°. On the other hand, cos $x$ assumes positive values when $x$ lies between 0° and 90° and between 270° and 360° and negative values when $x$ lies between 90° and 180° and between 180° and 270°. Thus if $x$ lies between 0° and 90°, both sin $x$ and cos $x$ are positive; and, as indicated in the above table $x$ is assigned a value of 45°. If sin $x$ is positive and cos $x$ negative then $x$ is assigned a value of 135°. If sin $x$ and cos $x$ are both negative, then $x$ is assigned a value of 225° and finally if sin x is negative and cos $x$ is positive then $x$ is assigned a value of 315°.

FIG. 3 shows part of a camera according to the first embodiment of the invention. Oscillations at the frequency $2\omega_3$, the second harmonic of the wobble frequency, derived from a master oscillator 1 are divided by two in a circuit 2 and applied to the field scan circuits 3 of a pickup tube 4 to impress the vertical spot wobble on the scanning electron beam of the tube. The filter described with reference to FIG. 2 is placed in front, in substantial focus on the photo-sensitive surface of the pickup tube 4 and signals derived from the tube 4 are applied, via a head amplifier 5 to a junction point 6. The output from the head amplifier 5, applied to the junction point 6, includes the following components:

a. base-band R + G + B
b. R − G amplitude modulated on frequency $\omega$
c. B − G amplitude modulated on frequency $\omega$
d. sum intermodulation component at $2\omega$
e. $\omega_3$ difference component generated by spot wobble, proportional to sin $(\phi_1 - \phi_2)$
f. $2\omega_3$ difference component by spot wobble, proportional to cos $(\phi_1 - \phi_2)$ Component ($a$) is isolated by a low pass filter 7 so that an equi-energy baseband signal represented as R + G + B is applied to a luminance output terminal 8. The components ($b$) and ($c$) referred to above are isolated by means of a band pass filter 9 having a pass band about the carrier frequency $\omega$, and these components are separated from one another by feeding them, on the one hand directly and on the other hand via a delay component 11, which exhibits a delay of one line period + 90° at the carrier frequency, to a matrixing circuit 10. Circuit 10 includes two channels, in the first of which the delayed and undelayed signals are added together and in the second of which the delayed signal is subtracted from the undelayed signal. By virtue of the equal and opposite inclination of the red absorbing and blue absorbing stripes in the filter means, the component ($c$) is removed, by cancellation, from the output of the first channel and similarly the component ($b$) is removed from the output of the second channel. The separated components are detected in detector circuits 12 and 13 respectively to give the signals |B − G| and |R − G|, and the signs for |B − G| and |R − G| are computed in the circuits inside the dashed outline 14, and in a pair of multiplying circuits 15 and 16 respectively. The outputs of multipliers 15 and 16 are applied respectively to further multipliers 17 and 18, these multipliers also receiving inputs from detectors 12 and 13 respectively. Multipliers 17 and 18 are connected to respective output terminals 19 and 20 at which the signals B − G and R − G appear. The multipliers include output circuits of a known kind which produce a positive output signal of one value when the product is positive and a negative output signal of the same value when the product is negative.

A bandpass filter 24, having a pass-band about $2\omega$ selects the sum intermodulation component ($d$), $2\omega t + \phi_1 + \phi_2$. The difference components ($e$) and ($f$) are demodulated from frequencies $\omega_3$ and $2\omega_3$ respectively by the multipliers 26 and 25, to give the components sin $(\phi_1 - \phi_2)$ and cos $(\phi_1 - \phi_2)$. Only the signs of these components are used as indicated previously with reference to the table. A unit 27 is arranged to derive a signal of one of four values to represent $(\phi_1 - \phi_2)$ to within ±45° from the signs of sin $(\phi_1 - \phi_2)$ and cos $(\phi_1 - \phi_2)$, and matrix this with the sum component ($d$) i.e. $2\omega t + \phi_1 + \phi_2$ to give $2(\omega t + \phi_1)$ and $2(\omega t + \phi_2)$ by performing a phase addition and a phase subtraction as follows:

$$2\omega t + \phi_1 + \phi_2 + (\phi_1 - \phi_2) = 2(\omega t + \phi_1)$$

$$2\omega t + \phi_1 + \phi_2 - (\phi_1 - \phi_2) = 2(\omega t + \phi_2)$$

The carriers of these phases are halved in frequency by the circuits 22 and 21 respectively, and in the half frequency form are used to ascertain the signs to be associated with the modulus signals |R−G| and |B−G| deriving respectively from the detector circuits 13 and 12. This is possible on the assumption that the sense ambiguity inherent in the carrier outputs of divider circuits 22 and 21 by reason of the frequency halving process is removed by correctly resetting the divider circuits at the start of each line as will be explained by means of information applied to terminal 23 of the divider circuits.

Thus to ascertain the sign to be attached to the modulus R—G the separated carrier of amplitude R—G derived from circuit 10 which is applied to detector circuit 13 to produce the modulus signal is applied also to the synchronous, or multiplicative, demodulator 16. This demodulator circuit also has applied to it the halved frequency carrier deriving from divider circuit 21. This carrier which is of the same frequency as the carrier of amplitude R—G applied from circuit 10 to the demodulator 16 has also by virtue of the correct resetting of the divider 21 the same phase as this latter carrier in the circumstance that the signal R—G is negative. In this circumstance the output of the demodulator 16 is used to attach a negative sign to the modulus signal |R—G|, this association being accomplished by means of the circuit 18 so that the signal R—G is set up in the output of circuit 8 as a negative quantity as required in the circumstance. On the other hand in the circumstance that the signal R—G is positive the output of the demodulator 16 is reversed in sense, since the demodulator is a phase-sensitive detector, and this reversed output applied to circuit 18 causes a positive sign to be attached to the modulus signal |R—G| so that the signal R—G now appears as a positive quantity in the output of circuit 18 as required in the reversed circumstance. The circuit 18 may be essentially a multiplier circuit. In this event in order to remove the effect of noise fluctuations of phase tending to modulate the output of the synchronous detector circuit 16 the output from this circuit is preferably limited to remove this effect prior to multiplication by limiting means included in circuit 18.

In another form of the circuit 18 the modulus signal |R—G| is established both in positive and negative forms and the output from the demodulator circuit 18 is used to operate switches to select whichever of the two forms is appropriate in the circumstance. In this case with appropriate design limiting to remove the effect of phase fluctuations is not necessary.

The signal B—G is similarly derived via circuits 12, 15 and 17 and appears at terminal 19.

As mentioned above the divide by two circuits 22 and 21 introduce a phase uncertainty of 180° in the divided signal. To overcome this, the signs of R—G and B—G must be known at the start of each line. A green index stripe, provided on the filter but outside the displayed picture area, can conveniently be used to provide the information required, i.e. a signal of known polarity, to ensure that the dividers are reset correctly. This information is applied to terminal 23, and if the output of either of the multipliers 17 and 18 is of incorrect sign while scanning the index stripe, then the appropriate divide by two circuit is reset. The output of multiplier 18 is applied to a polarity sensing circuit and if the polarity is incorrect for a "green" signal, a signal is applied to terminal 23 to reverse the outputs of both 21 and 22.

In a second embodiment of the invention, the index carrier signals are reconstructed from information made available by omitting certain of the coloured stripes. For example, every second blue absorbing stripe and every second red absorbing stripe may be omitted from the striped filter. The filter then consists of the superimposition of two sets of stripes corresponding to the two colour carrier signals. These two sets are shown separately in FIGS. 4(*a*) and (*b*) respectively for simplicity.

The effect of omitting every other absorbing stripe of one colour is to divide by two the amplitude of the carrier signal component of that colour, while at the same time introducing a reference component at half the carrier frequency. Therefore, twice as much light is required at the colour in question from whites. In the case of the filter of FIG. 4 there are two separate reference components, which change phase by ± 90° over two lines, and which may therefore be separated in a manner similar to the colour difference carriers. The presence of the reference carriers in the middle of what would otherwise be the luminance band makes the system unsuitable for a single tube camera. If the colour information only is required from the tube however, and if said tube forms part of a two tube camera which has a second tube to provide the luminance information, then the processing circuits shown in FIG. 5 can be utilised for signals derived from the first mentioned tube, and these circuits are simpler than those described with reference to FIG. 3.

Referring to FIG. 5, a pick-up tube 28 feeds a head amplifier 29, the output of which contains four signal components of interest. These are I. a colour difference signal, R—G say, at a frequency of say 3MHz, which phase advances 90° from line to line. The amplitude of this carrier is proportional to R—G.

II. a colour difference signal, B—G, at essentially the same frequency as (I) which phase retards 90° from line to line.

III. an index carrier, proportional to the red component of light, which is generated by the stripes which generate component I. It is at exactly half the frequency of (I), and therefore phase advances 45° from line to line.

IV. an index carrier, proportional to the blue component, at exactly half the frequency of (II). It phase retards 45° from line to line.

The circuit 30 has a delay of 360° at the colour difference frequency of (I) and (II) and therefore a delay of 180° at the index frequency of (III) and (IV). Adding its input and output in 32 isolates components (I) and (II), while subtracting the input and output of circuit 30 in circuit 31 isolates components (III) and (IV).

Components (I) and (II) are separated by known means in circuits 34 and 36. The separation is similar to the separation of the R—Y and B—Y subcarriers in a PAL-D receiver. Components (III) and (IV) are separated in circuits 33 and 35 in the same manner. The differences in the delay times imparted by components 33 and 34 respectively arise because one 33 is operating at the index carrier frequency and the other 34 is operating at the colour difference carrier frequency.

The B—G index component (IV) at the output of circuit 35 is at exactly half the frequency of the B—G carrier component (11) at the output of circuit 36. The index signal is therefore frequency (doubled by means not shown) and used to synchronously demodulate the colour difference signal in circuit 37. Circuit 38 applies the same process to the R—G signal.

In practice the colourimetry of the stripes could be arranged so that the signals were closer to R—Y and B—Y. In any case they could be matrixed to give a close approximation to R—Y and B—Y.

If required, the low frequency components from the head amplifier may be used as a baseband luminance signal which is isolated by means of a low pass filter 39 having a cut off below the index carrier frequency.

What I claim is:

1. A colour television camera which includes filter means for analysing a viewed scene with respect to three primary colours, a pickup tube including a target for receiving the analysed image of the scene, or an intensified version thereof, the filter means being such as to cause video signals derived on scanning the target of the pickup tube with the electron beam thereof to include a first carrier wave of which the amplitude represents the difference in intensity between two of said primary colours and a second carrier wave of which the amplitude represents the difference in intensity between the third and one of said two primary colours, and a circuit arrangement for determining the amplitude and polarity of each of the modulations of said carrier waves.

2. A colour television camera including at least one pick-up tube having a light sensitive target on which light from a viewed scene can be incident, filter means interposed between the scene and the target for permitting light of three different spectral compositions to fall on respective parts of the target, said parts comprising, for light of a first and a second of said spectral compositions, a respective series of spaced, substantially parallel stripes, the two series of stripes being inclined relative to one another, and for light of the third spectral composition, discrete regions including areas interposed between the two series of stripes, so that video signals derived on scanning said target with the electron beam of the tube include two carrier signals amplitude modulated by quantities indicative respectively of the differences between the intensities of light of said first and third spectral compositions and between the intensities of light of said second and third spectral compositions incident on said target, means being provided for determining the amplitude and polarity of said difference quantites.

3. A camera according to claim 2 wherein said filter means is such that the two series of stripes are inclined at substantially equal but opposite angles relative to the line scanning direction of the pickup tube.

4. A camera according to claim 2 wherein the filter means is such that, in each of said series of stripes, the spaces between adjacent stripes are substantially the same width as the stripes themselves, the parts of the target upon which light of said third spectral composition can be incident comprising substantially only areas between said two series of stripes.

5. A camera according to claim 2 wherein the filter means is such that in each of said series of stripes, the spaces between adjacent stripes are substantially one third of the width of the stripes themselves.

6. A camera according to claim 5 wherein said filter means is such that said video signals include indexing information impressed on a second carrier signal of half the frequency of said first mentioned carrier signal.

7. A camera according to claim 6 including a circuit arrangement for separating the indexing information from the information indicative of said difference quantities, and means for utilising said indexing information to demodulate said quantities.

8. A camera according to claim 2 including a circuit arrangement for deriving two further signals, indicative respectively of the signs of said difference quantities, from said video signals.

9. A camera according to claim 8 wherein said circuit arrangement includes means for impressing on said electron beam a spot wobble of frequency different from that of said carrier signal.

10. A camera according to claim 9 wherein said circuit arrangement includes a band-pass filter adapted to pass components of said video signals lying in a frequency band on either side of a frequency corresponding to twice the frequency of said carrier signal, respective circuits for mixing said video signals with signals of the spot wobbling frequency and twice the spot wobbling frequency, and means for matrixing output signals derived from said band-pass filter and from each of the mixing circuits to generate respective signals indicative of said signs.

11. A camera according to claim 2 including means for deriving from said video signals a baseband luminance signal.

* * * * *